(12) United States Patent
Aoyanagi et al.

(10) Patent No.: US 11,760,428 B2
(45) Date of Patent: Sep. 19, 2023

(54) VEHICLE FRONT STRUCTURE AND FRONT EXTERIOR MEMBER

(71) Applicants: SUBARU CORPORATION, Tokyo (JP); TOYOTA JIDOSHA KABUSHIKI KAISHA, Toyota (JP)

(72) Inventors: Hiroki Aoyanagi, Tokyo (JP); Hideki Hata, Tokyo (JP); Koushi Yamada, Odawara (JP)

(73) Assignee: SUBARU CORPORATION, Tokyo (JP)

( * ) Notice: Subject to any disclaimer, the term of this patent is extended or adjusted under 35 U.S.C. 154(b) by 11 days.

(21) Appl. No.: 17/526,602

(22) Filed: Nov. 15, 2021

(65) Prior Publication Data

US 2022/0153357 A1    May 19, 2022

(30) Foreign Application Priority Data

Nov. 17, 2020 (JP) ................................. 2020-190673

(51) Int. Cl.
*B62D 35/00* (2006.01)
*B62D 35/02* (2006.01)

(52) U.S. Cl.
CPC ........... *B62D 35/005* (2013.01); *B62D 35/02* (2013.01)

(58) Field of Classification Search
CPC ....... B60R 19/02; B60R 19/023; B62D 25/16; B62D 35/001; B62D 35/005; B62D 35/008; B62D 35/02
USPC .......................................... 296/180.1, 181.5
See application file for complete search history.

(56) References Cited

U.S. PATENT DOCUMENTS

| | | | |
|---|---|---|---|
| 9,637,180 B2* | 5/2017 | Wolf | B60K 11/04 |
| 9,669,807 B2* | 6/2017 | Wolf | F16D 65/847 |
| 2012/0071075 A1* | 3/2012 | Wolf | B60T 5/00 454/162 |
| 2013/0233658 A1* | 9/2013 | Carmassi | B62D 35/005 188/264 R |
| 2014/0175830 A1* | 6/2014 | Hasegawa | B62D 35/00 296/180.1 |

(Continued)

FOREIGN PATENT DOCUMENTS

| | | |
|---|---|---|
| DE | 102016014497 A1 | 6/2018 |
| DE | 102017009595 A1 * | 7/2018 |

(Continued)

OTHER PUBLICATIONS

Japanese Office Action dated Oct. 4, 2022, in corresponding Japanese Patent Application No. 2020-190673, with an English translation hereof.

*Primary Examiner* — Jason S Daniels
(74) *Attorney, Agent, or Firm* — McGinn I.P. Law Group, PLLC

(57) ABSTRACT

A vehicle front structure for a vehicle including a front exterior member provided on a front surface of a vehicle body includes a front introduction hole and a duct structure. The front introduction hole is formed in an end portion of the front exterior member in a vehicle width direction. The duct structure is coupled to the front introduction hole inside the front exterior member. The duct structure includes a rear exhaust hole that exhausts air to a wheel house located at a rear side of the front exterior member in the vehicle body, and a branch exhaust hole formed in a flow path section provided between the front introduction hole and the rear exhaust hole.

11 Claims, 5 Drawing Sheets

(56) References Cited

U.S. PATENT DOCUMENTS

2016/0272258 A1   9/2016  Gibson et al.
2018/0148108 A1*  5/2018  Del Gaizo ........... B62D 35/008

FOREIGN PATENT DOCUMENTS

| JP | S62-166138 | A |   | 7/1987  |             |
|----|------------|---|---|---------|-------------|
| JP | H03-013423 | U |   | 2/1991  |             |
| JP | 2004-338602| A |   | 12/2004 |             |
| JP | 2016132301 | A | * | 7/2016  | ............. B62D 25/16 |
| JP | 2016-147554| A |   | 8/2016  |             |

* cited by examiner

VEHICLE FRONT STRUCTURE AND FRONT EXTERIOR MEMBER

CROSS-REFERENCE TO RELATED APPLICATIONS

This application is based on and claims priority under 35 USC 119 from Japanese Patent Application No. 2020-190673 filed on Nov. 17, 2020, the contents of which are incorporated herein by reference.

The present disclosure relates to a vehicle front structure and a front exterior member.

A vehicle such as an automobile has a vehicle body. An airflow is generated around the vehicle body during traveling. Air at a traveling direction side of the vehicle body hits a front surface of the vehicle body, and then is divided to the left and right in a vehicle width direction along the front surface of the vehicle body. An airflow traveling along the front surface in the vehicle width direction interflow with an airflow at an outer of a side surface of the vehicle body at a corner portion between the front surface and the side surface of the vehicle body. An air pressure is increased at the corner portion of the vehicle body, and an airflow is likely to flow further outward in the vehicle width direction from the corner portion of the vehicle body.

SUMMARY

An aspect of the disclosure provides a vehicle front structure for a vehicle. The vehicle includes a front exterior member provided on a front surface of a vehicle body of the vehicle. The vehicle front structure includes a front introduction hole and a duct structure. The front introduction hole is formed in an end portion of the front exterior member in a vehicle width direction. The duct structure is coupled to the front introduction hole inside the front exterior member. The duct structure includes a rear exhaust hole and a branch exhaust hole. The rear exhaust hole is to configured to exhaust air to a wheel house located at a rear side of the front exterior member in the vehicle body. The branch exhaust hole is formed in a flow path section provided between the front introduction hole and the rear exhaust hole.

An aspect of the disclosure provides a front exterior member provided on a front surface of a vehicle body of a vehicle. The front exterior member includes a front introduction hole and a duct structure. The front introduction hole is formed in an end portion of the front exterior member in a vehicle width direction. The duct structure is coupled to the front introduction hole inside the front exterior member. The duct structure includes a rear exhaust hole and a branch exhaust hole. The rear exhaust hole is configured to exhaust air to a wheel house located at a rear side of the front exterior member in the vehicle body. The branch exhaust hole is formed in a flow path section provided between the front introduction hole and the rear exhaust hole.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DESCRIPTION OF EMBODIMENTS

Figure 1A:
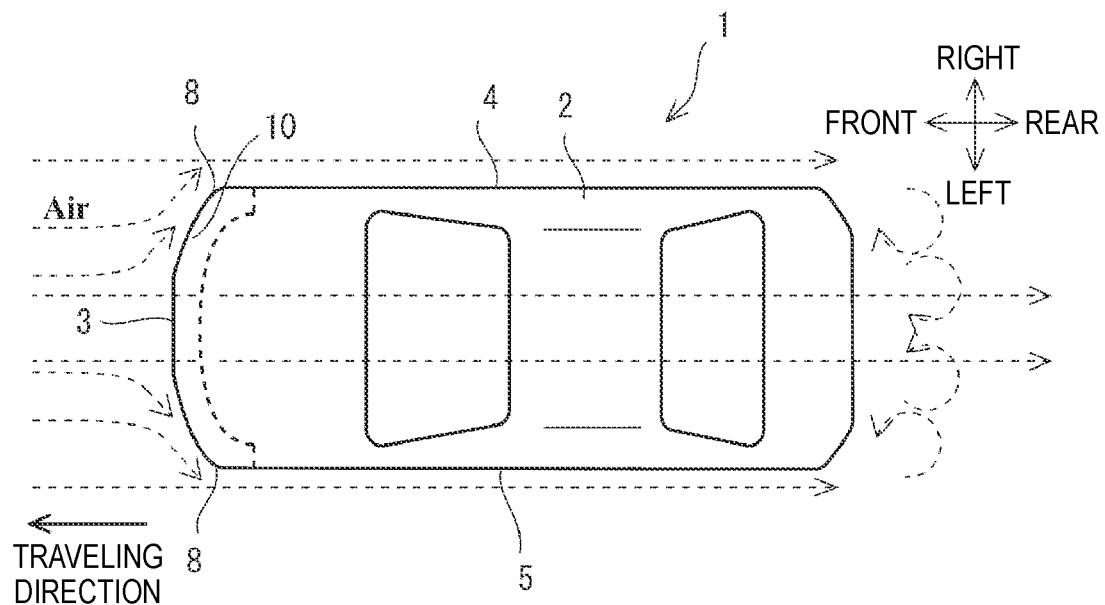
FIG. 1A is a plan view showing an automobile according to an embodiment.

An airflow is a factor that hinders an improvement of aerodynamic performance of a vehicle, for example, an improvement of aerodynamic characteristics and steering stability.

For example, it is considered to provide a front introduction hole in a front surface of a vehicle body as disclosed in Japanese Unexamined Patent Application Publication (JP-A) No. S62-166138, Japanese Unexamined Utility Model (Registration) Application Publication (JP-UM-A) No. H03-013423, and JP-A No. 2016-147554. The front introduction hole provided in the front surface of the vehicle body takes in a part of air that hits the front surface of the vehicle body, so that it can be expected that an airflow flowing in a vehicle width direction along the front surface can be reduced and an aerodynamic performance of the vehicle can be improved.

However, even when the front introduction hole is simply provided in the front surface of the vehicle body, the effect of improving the aerodynamic performance of the vehicle by the front introduction hole is limited.

For example, even when the front introduction hole is formed in a central lower portion of the front surface as in JP-A No. S62-166138, JP-UM-A No. H03-013423, and JP-A No. 2016-147554, it is not possible to obtain an effect in which an airflow hits the front surface outside the front introduction hole. In a case where a wall-shaped member is provided inside the front introduction hole as in JP-A No. S62-166138, JP-UM-A No. H03-013423, and JP-A No. 2016-147554 and a direction of an airflow is changed to a direction along an exterior surface of the vehicle body by the wall-shaped member, a flow rate at which air can flow into the front introduction hole is less likely to be increased.

Even when the front introduction hole is formed only in a lower portion of the front surface of the vehicle body where an under spoiler is provided as in JP-UM-A No. H03-013423, an effect cannot be obtained for an airflow hitting the front surface above the front introduction hole.

Even when a front introduction hole as disclosed in JP-A No. S62-166138, JP-UM-A No. H03-013423, and JP-A No. 2016-147554 is provided to obtain an improvement effect on aerodynamic performance such as aerodynamic characteristics and steering stability of a vehicle, it is unlikely to obtain a good improvement effect.

As described above, it is desired to improve aerodynamic performance such as aerodynamic characteristics and steering stability of a vehicle in the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1A is a plan view showing an automobile 1 according to an embodiment.

Figure 1B:
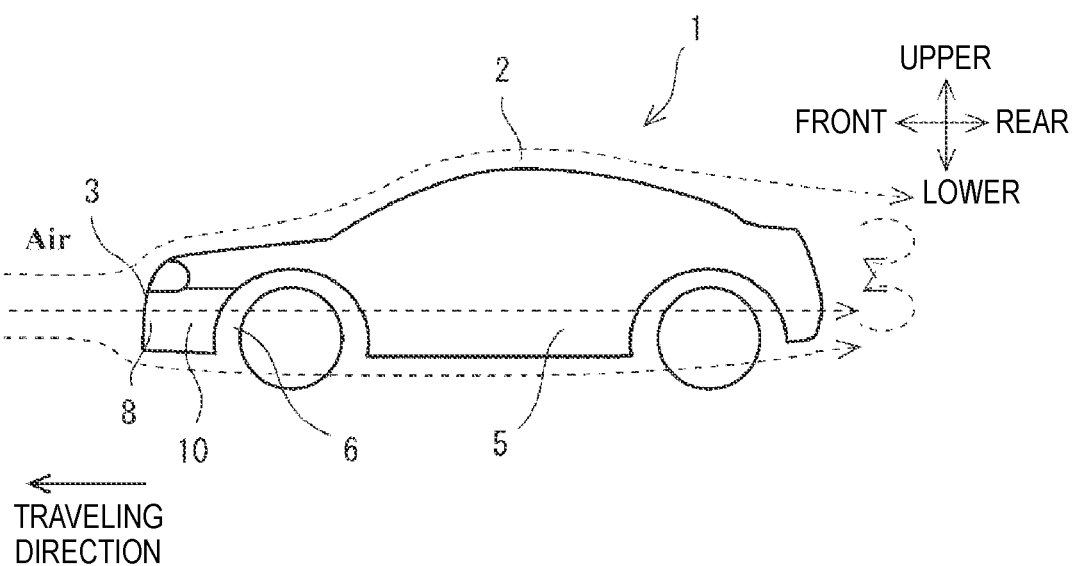
FIG. 1B is a left side view showing the automobile in FIG. 1A.

FIG. 1B is a left side view showing the automobile 1 in FIG. 1A.

The automobile 1 is an example of a vehicle.

The automobile 1 in FIGS. 1A and 1B has a vehicle body 2. The automobile 1 can travel forward or rearward by a manual operation of an occupant or by autonomous driving. The automobile 1 can travel in a right front direction, a left front direction, a right rear direction, or a left rear direction by steering.

Airflows flowing along a shape of the vehicle body 2 are generated around the vehicle body 2 during traveling as indicated by dashed arrows in the drawings. Air at a traveling direction side of the vehicle body 2 hits a front surface 3 of the vehicle body 2, and then is divided toward left and right side surfaces 4 and 5 and an upper surface of the vehicle body 2 and flows along the side surfaces and the upper surface of the vehicle body 2, and airflows join at a rear side of the vehicle body 2. A slight vortex flow is generated at the rear side of the vehicle body 2 due to the entrainment of the airflows. These airflows are one factor that hinders traveling of the automobile 1.

A front bumper face member 10 is provided at a lower portion of the front surface 3 of the vehicle body 2. The front bumper face member 10 is, for example, a component formed of a resin material. The front bumper face member 10 is provided at a front portion of the vehicle body 2 as one front exterior member.

The front exterior member may constitute an outer surface of the front portion of the vehicle body 2.

Both left and right sides of the front bumper face member 10 in a vehicle width direction of the vehicle body 2 extend in a manner of being curved rearward. Rear ends of the left and right side surfaces 4 and 5 of the vehicle body 2 of the front bumper face member 10 extend to a wheel house 6.

Corner portions 8 of the front bumper face member 10 from the front surface 3 to the side surface portions of the vehicle body 2 are formed into a smooth curved surface shape.

Since the corner portion 8 is formed into a curved surface shape, air at the traveling direction side of the vehicle body 2 hits the front bumper face member 10 provided on the front surface 3 of the vehicle body 2, and then flows along the outer shape of the front bumper face member 10 to join with airflows flowing from a front side to a rear side at outer sides of the left and right sides of the vehicle body 2.

Figure 2:
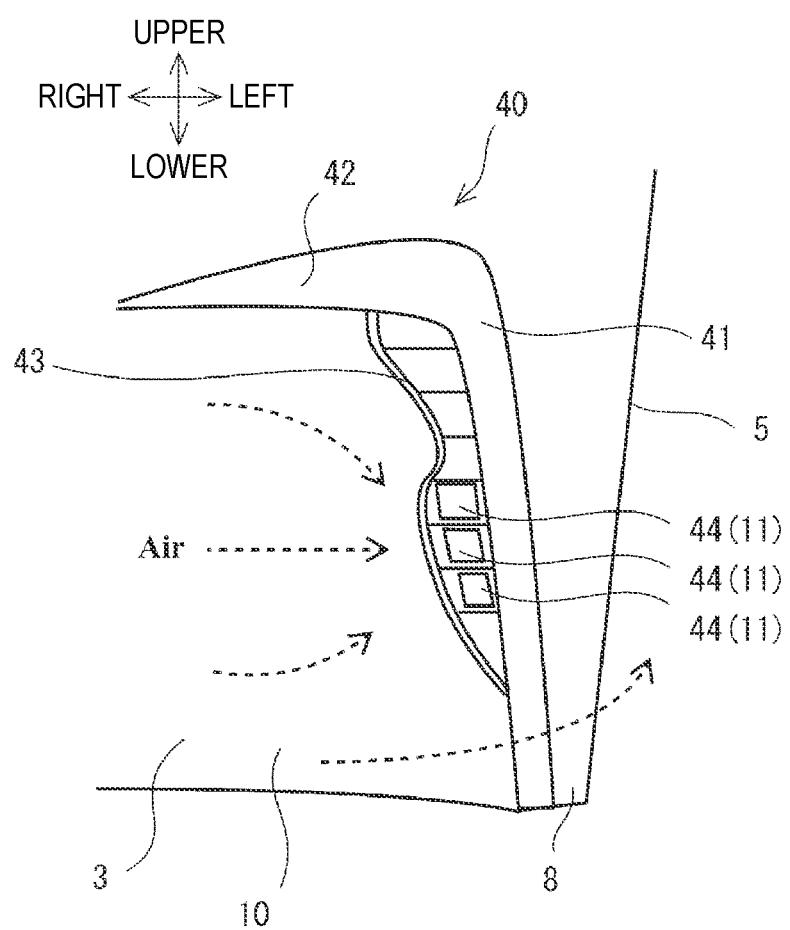
FIG. 2 is a front view showing an external structure of a left front portion of the automobile shown in FIG. 1A.

FIG. 2 is a front view showing an external structure of a left front portion of the automobile 1 in FIG. 1A.

As shown in FIG. 2, a left cover member 40 is disposed at the left front portion of the front bumper face member 10.

The cover member 40 includes a vertical portion 41, a horizontal portion 42, a plate portion 43, and a plurality of plate holes 44.

The vertical portion 41 extends in an upper-lower direction along a left edge of the front surface 3 of the vehicle body 2 of the automobile 1.

The horizontal portion 42 extends from an upper end of the vertical portion 41 extending in the upper-lower direction toward an inner side (center side) of the vehicle body 2.

The plate portion 43 is provided inside the vertical portion 41 in the vehicle width direction. An outer edge of the plate portion 43 in the vehicle width direction is bordered by the vertical portion 41 that is vertically long, and an upper edge of the plate portion 43 is bordered by the horizontal portion 42.

The plurality of plate holes 44 are vertically arranged side by side in the plate portion 43.

The plurality of plate holes 44 overlap with a front introduction hole 11 at a left side of the front bumper face member 10.

The front introduction hole 11 at the left side of the front bumper face member 10 is formed to be vertically long along an edge in the vehicle width direction of the front bumper face member 10 in a range in which the front bumper face member 10 can be viewed from the front side. The front introduction hole 11 at the left side may be formed in the front bumper face member 10 at a position where, for example, a fog lamp is usually provided.

An external structure of a right front portion of the automobile 1 may be symmetrical to the external structure of the left front portion shown in FIG. 2, and a right cover member 40 symmetrical to the left cover member 40 is provided.

Figure 3:
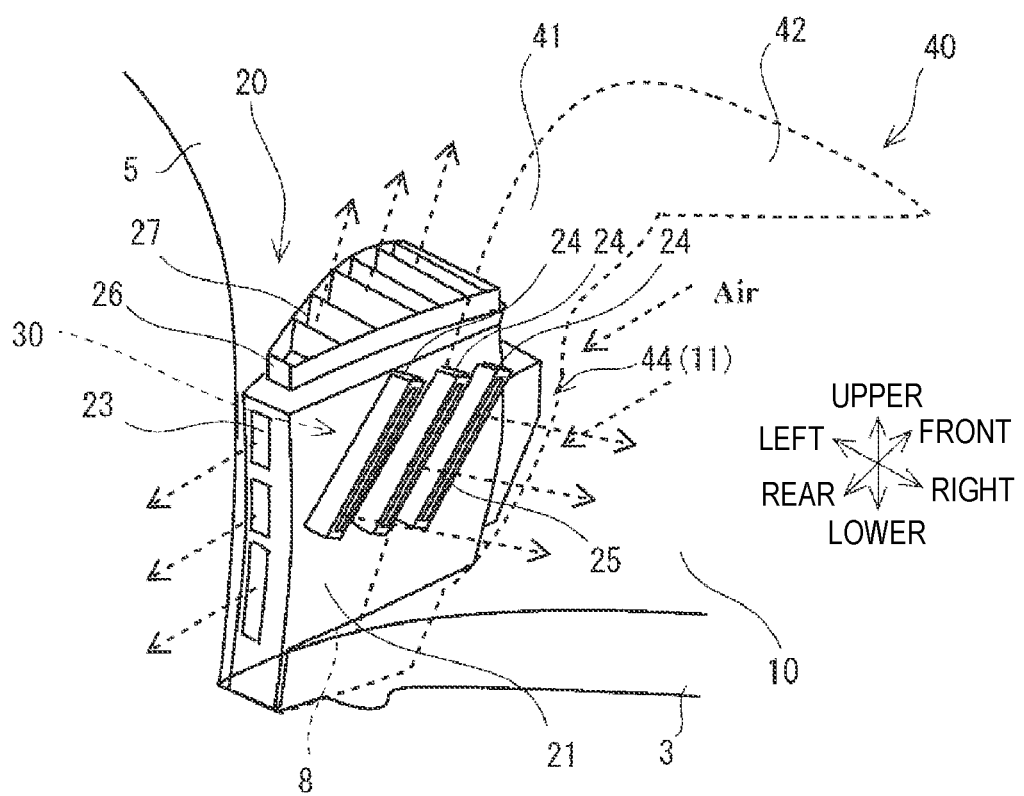
FIG. 3 is a perspective view showing an internal structure of the left front portion in FIG. 2.

FIG. 3 is a perspective view showing an internal structure of the left front portion in FIG. 2.

As shown in FIG. 3, a left duct member 20 is disposed inside the left front portion of the front bumper face member 10.

The duct member 20 includes a main duct portion 21, a rear exhaust hole 23, an inner branch duct portion 24, an inner branch exhaust hole 25, an upper branch duct portion 26, and an upper branch exhaust hole 27.

The main duct portion 21 overlaps with an inner surface of the front bumper face member 10, and a duct structure 30 is formed between the main duct portion 21 and the front bumper face member 10. The main duct portion 21 may overlap with the inner surface of the front bumper face member 10 from the front surface 3 where the front introduction hole 11 at the left side of the front bumper face member 10 is opened to a rear end of a side surface portion of the front bumper face member 10.

The main duct portion 21 may have, for example, a shape obtained by cutting a part of a hollow cube along the inner surface of the front bumper face member 10. A peripheral edge of the main duct portion 21 formed in such a manner may be bonded or fused to the inner surface of the front bumper face member 10. A seam member may be interposed between the peripheral edge of the main duct portion 21 and the inner surface of the front bumper face member 10. Accordingly, the duct structure 30 in which the main duct portion 21 overlaps with the inner surface of the front bumper face member 10 can withstand a high internal pressure.

In the duct structure 30 formed in such a manner, the front introduction hole 11 at the left side of the front bumper face member 10 serves as an intake hole for introducing air into the duct structure 30.

The main duct portion 21 may have a hollow cubic shape as a single body. In this case, an intake hole for introducing air into the duct structure 30 may be formed in the main duct portion 21 at a portion overlapping with the front introduction hole 11 at the left side of the front bumper face member 10.

The rear exhaust hole 23 is an exhaust hole for exhausting air in the duct structure 30. The rear exhaust hole 23 is formed in a rear end portion of the main duct portion 21. The rear exhaust hole 23 is formed to be vertically long in a manner in which, for example, a plurality of holes are vertically arranged side by side in the rear end portion of the main duct portion 21. In this case, the rear exhaust hole 23 exhausts air to the wheel house 6 located at the rear side of the front bumper face member 10 in the vehicle body 2.

An airflow entering the duct structure 30 from the front introduction hole 11 at the left side of the front bumper face member 10 flows from the front to the rear of the vehicle body 2 along the duct structure 30, and can be exhausted from the rear exhaust hole 23 to a rear side that is outside of the duct structure 30.

The inner branch duct portion 24 is formed on an inner surface portion of the main duct portion 21 in a manner of protruding forward inside the vehicle body 2. Accordingly, the inner branch duct portion 24 is formed in a flow path section from the front introduction hole 11 to the rear exhaust hole 23 in the main duct portion 21.

The inner branch exhaust hole 25 is formed at a tip end of the inner branch duct portion 24. An airflow flowing toward the inner branch exhaust hole 25 through the inner branch duct portion 24 is in a direction intersecting at an obtuse angle with a direction of an airflow flowing from the front introduction hole 11 at the left side toward the rear exhaust hole 23 in the duct structure 30. An airflow in the inner branch duct portion 24 is in a direction opposite to a direction of an airflow in the duct structure 30. An airflow flowing from the front introduction hole 11 at the left side toward the rear exhaust hole 23 has large resistance when the airflow flows toward the inner branch duct portion 24 in the duct structure 30.

An airflow exhausted from the inner branch exhaust hole 25 is exhausted to an engine room provided inside the front bumper face member 10.

The upper branch duct portion 26 is formed at an upper surface portion of the main duct portion 21 in a manner of protruding upward and forward of the vehicle body 2. Accordingly, the upper branch duct portion 26 is formed in a flow path section from the front introduction hole 11 to the rear exhaust hole 23 in the main duct portion 21.

The upper branch exhaust hole 27 is formed at a tip end of the upper branch duct portion 26. An airflow flowing toward the upper branch exhaust hole 27 through the upper branch duct portion 26 intersects at an obtuse angle with an airflow flowing from the front introduction hole 11 at the left side toward the rear exhaust hole 23 in the duct structure 30. An airflow in the upper branch duct portion 26 is in a direction opposite to a direction of an airflow in the duct structure 30. An airflow flowing from the front introduction hole 11 at the left side toward the rear exhaust hole 23 has large inflow resistance when the airflow flows toward the upper branch duct portion 26 in the duct structure 30.

An airflow exhausted from the upper branch exhaust hole 27 is exhausted to an engine room provided inside the front bumper face member 10.

The internal structure of a right front portion of the automobile 1 may be symmetrical to the external structure of the left front portion shown in FIG. 2, and a right duct member 20 symmetrical to the left duct member 20 is provided.

Figure 4:
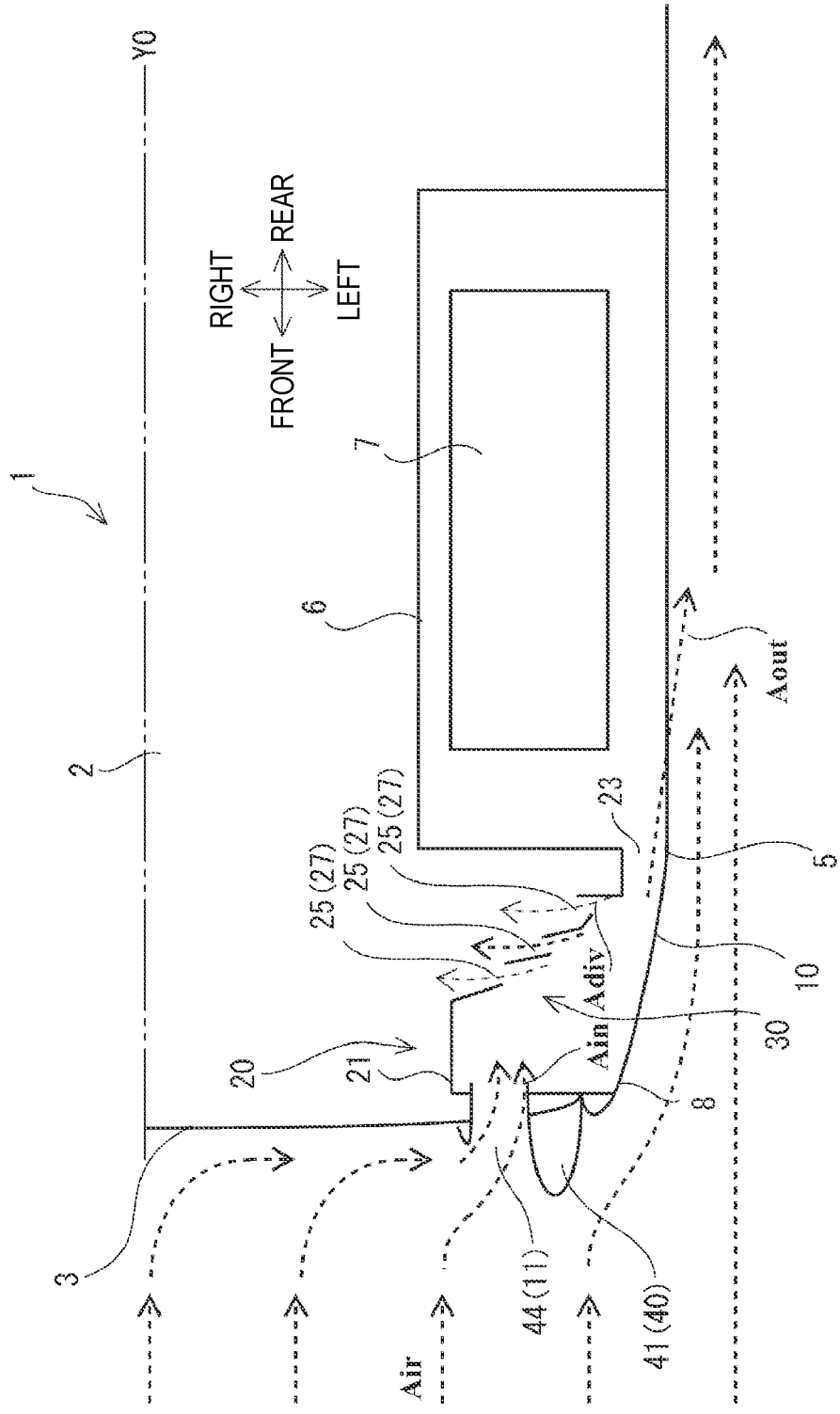
FIG. 4 is a view showing an airflow at the structure of the left front portion in FIGS. 2 and 3.

FIG. 4 is a view showing an airflow at the structure of the left front portion in FIGS. 2 and 3.

In FIG. 4, the rear exhaust hole 23 of the left duct member 20 is positioned vertically long along an outer edge of the wheel house 6. Accordingly, at least a part of an airflow Aout exhausted from the rear exhaust hole 23 to the wheel house 6 flows outward from an outer surface of a wheel member 7 disposed in the wheel house 6. The wheel member 7 is less likely to hinder air exhausting from the rear exhaust hole 23 to the wheel house 6. When a pressure of an airflow hitting the wheel member 7 or a pressure of an airflow hitting a mudguard (not shown) at the rear of the wheel house 6 is increased, a CD value (Coefficient of Drag value) may be deteriorated, and steering stability may be deteriorated.

An airflow Adiv in the inner branch duct portion 24 flows along the vehicle width direction of the vehicle body 2. The airflow in the inner branch duct portion 24 flows in a direction intersecting in an opposite direction with a direction of an airflow from the front introduction hole 11 at the left side toward the rear exhaust hole 23 in the duct structure 30.

An airflow at the structure of the right front portion of the automobile 1 is symmetrical with that shown in FIG. 2.

Then, as indicated by broken line arrows in the drawing, air at the traveling direction side of the vehicle body 2 hits the front surface 3 of the vehicle body 2, and then flows outward along the front surface 3 of the vehicle body 2. The airflow flowing outward along the front surface 3 enters the duct structure 30 from the front introduction hole 11 at the left side of the front bumper face member 10. In the present embodiment, in particular, since the vertical portion 41 of the left cover member 40 is provided in a manner of protruding to an outer side in the vehicle width direction relative to the front introduction hole 11 at the left side, the airflow flowing outward along the front surface 3 is hindered by the vertical portion 41, and can efficiently enter the duct structure 30 from the front introduction hole 11 at the left side.

An airflow Ain entering the duct structure 30 from the front introduction hole 11 at the left side flows from the front to the rear of the vehicle body 2 along the duct structure 30, and is exhausted from the rear exhaust hole 23. A part of the airflow entering the duct structure 30 from the front introduction hole 11 at the left side may be exhausted so as to leak to the engine room provided inside the front bumper face member 10 through the inner branch duct portion 24 into which an airflow is basically less likely to flow.

An airflow Aout exhausted from the rear exhaust hole 23 flows outward than an outer surface of the wheel member 7 disposed in the wheel house 6.

As a result, most of the airflow flowing along the front surface 3 is exhausted to the rear side through the duct structure 30, so that the airflow is less likely to flow through the corner portion 8 of the vehicle body 2.

Since the airflow flowing toward the corner portion 8 along the front surface 3 of the vehicle body 2 is reduced, an amount of an airflow interflowing with an airflow flowing at an outer side of the left side surface 5 of the vehicle body 2 is reduced. An airflow (a main flow) flowing at an outer side of the left side surface 5 of the vehicle body 2 is less likely to be disturbed by an airflow flowing from the front surface 3 of the vehicle body 2 toward the corner portion 8. It is possible to prevent an airflow from hindering traveling of the automobile 1.

Figure 5:
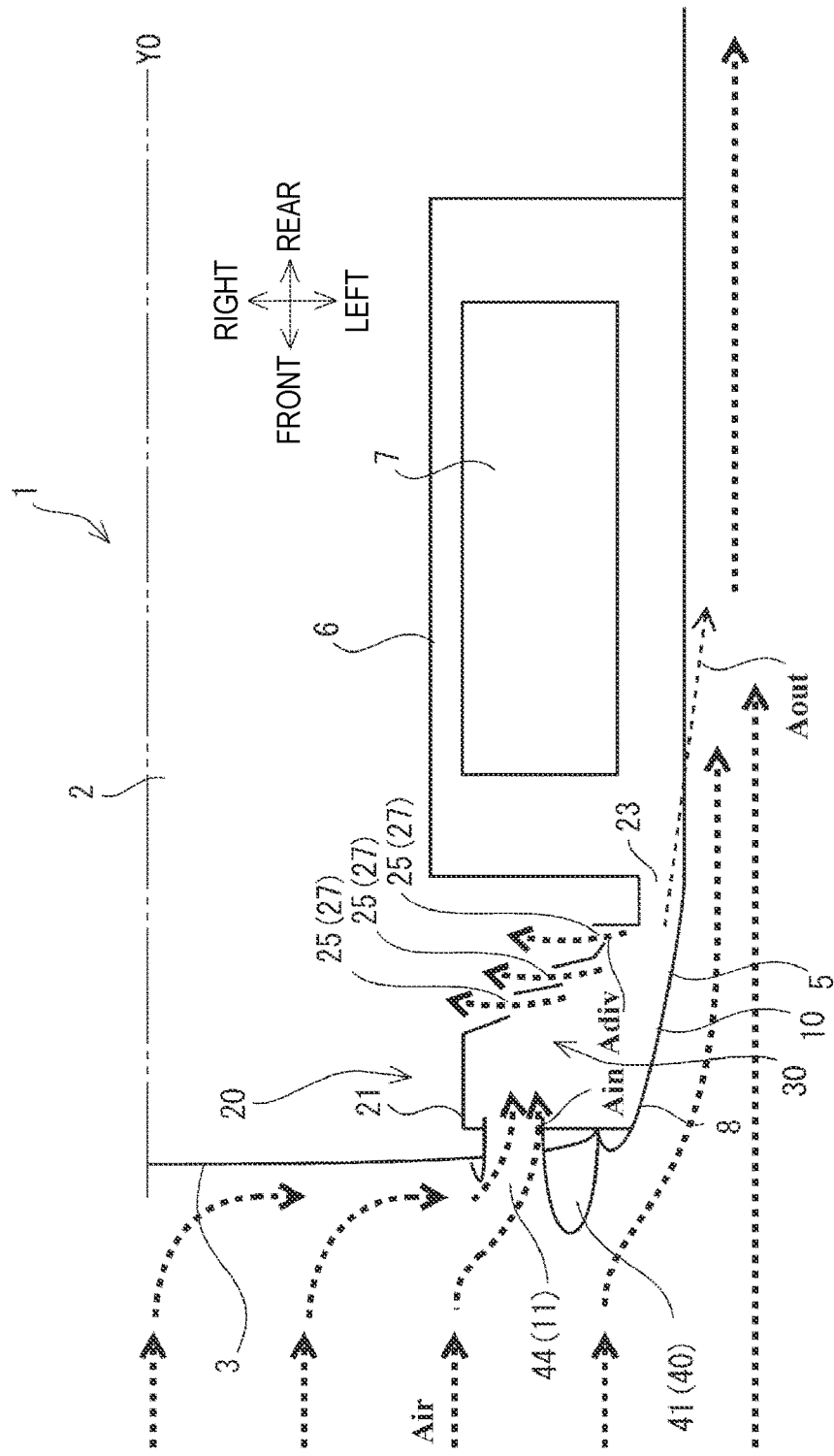
FIG. 5 is a view showing an airflow at the structure of left front portion when an automobile moves at a higher speed than that in FIG. 4.

FIG. 5 is a view showing an airflow at the structure of the left front portion when the automobile 1 moves at a higher speed than that in FIG. 4.

An airflow at the structure of the right front portion of the automobile 1 is symmetrical with that shown in FIG. 2.

When the automobile 1 moves at a higher speed than that in FIG. 4, an amount of an airflow hitting the front surface 3 of the vehicle body 2 increases. An amount of the airflow Ain flowing along the front surface 3 and entering the duct structure 30 from the front introduction hole 11 at the left side of the front bumper face member 10 also increases.

In this case, the airflow Ain entering the duct structure 30 from the front introduction hole 11 at the left side flows from the front to the rear of the vehicle body 2 along the duct structure 30, is exhausted from the rear exhaust hole 23, and is exhausted to the engine room through the inner branch duct portion 24. An amount and a ratio of the airflow Adiv exhausted to the engine room through the inner branch duct portion 24 are increased. In the duct structure 30, an overflow of airflow may be generated.

Accordingly, even when the automobile 1 moves at a higher speed than that in FIG. 4, an amount of the airflow Ain that can enter the duct structure 30 from the front introduction hole 11 at the left side can be increased, and an amount of the overflow airflow that flows toward the corner portion 8 through the front introduction hole 11 at the left side along the front surface 3 of the vehicle body 2 is less likely to increase.

As a result, most of the airflow flowing along the front surface 3 is exhausted to the rear side through the duct structure 30 and the airflow is less likely to flow toward the corner portion 8 of the vehicle body 2.

Here, for example, an area S(Ain) of the front introduction hole 11 at the left side and an area S(Aout) of the rear exhaust hole 23 may be substantially equal to each other. On the other hand, a sum S(Adiv) of areas of the inner branch exhaust holes 25 and areas of the upper branch exhaust holes 27 may be twice or more, preferably three times the area S(Aout) of the rear exhaust hole 23.

Even when a total area of the branch exhaust holes is larger than the area of the rear exhaust hole 23 in this manner, since the inflow resistance of an airflow from the front introduction hole 11 at the left side to the branch exhaust hole is high, a flow from the front introduction hole 11 at the left side to the branch exhaust hole is not dominant, and a flow from the front introduction hole 11 at the left side to the rear exhaust hole 23 can be ensured or maintained. An amount of an airflow from the front introduction hole 11 at the left side to the rear exhaust hole 23 is less likely to increase greater than that in a case where no branch exhaust hole is provided or in a case where the branch exhaust hole is not provided sufficiently.

Since an amount of an airflow that can flow in from the front introduction hole 11 at the left side increases, it is possible to prevent a case where an airflow flowing along the front surface 3 of the vehicle body 2 cannot enter the front introduction hole 11 at the left side, and it is possible to effectively prevent an airflow from flowing toward the corner portion 8 of the vehicle body 2 through the front introduction hole 11 at the left side.

In the present embodiment, both airflow relationships shown in FIGS. 4 and 5 can be achieved as described above, and an airflow can be effectively prevented from flowing toward the corner portion 8 of the vehicle body 2 through the front introduction hole 11 at the left side.

When an airflow flowing along the front surface 3 of the vehicle body 2 flows toward the corner portion 8 of the vehicle body 2, the steering stability is likely to deteriorate. In particular, when a speed is high, the steering stability remarkably deteriorates.

In the present embodiment, even when a speed of the automobile is high and a flow rate is increased, it is possible to maintain a function of the duct structure 30 and prevent deterioration of the steering stability. As a result, for example, it is possible to improve or stabilize response at the time of steering and responsiveness of steering in the present embodiment.

As described above, in the present embodiment, the front introduction hole 11 is formed at an end portion in the vehicle width direction of the front bumper face member 10 provided on the front surface 3 of the vehicle body 2. The duct structure 30 connected to the front introduction hole 11 at an inner side of the front bumper face member 10 includes the rear exhaust hole 23 for exhausting air to the wheel house 6 located at the rear side of the front bumper face member 10 in the vehicle body 2, and branch exhaust holes 25 and 27 formed in a flow path section from the front introduction hole 11 to the rear exhaust hole 23.

The duct structure 30 having such a configuration couples the end portion in the vehicle width direction of the front bumper face member 10 and even the wheel house 6 located at the rear side, and basically serves the duct structure 30 of a flow path along the front-rear direction of the vehicle body 2. As a result, an airflow flowing in from the front introduction hole 11 can flow through the inner side of the duct structure 30 without changing the airflow when the airflow flows in and without being greatly bent in a flow direction or being hindered by a wall-shaped member, so that the airflow flowing in from the front introduction hole 11 can be exhausted to the wheel house 6. An airflow in the duct can be exhausted while maintaining the same momentum as an airflow outside the vehicle body 2.

As a result, in the present embodiment, a part of an airflow that hits the front surface 3 of the vehicle body 2 can be exhausted to the rear side through the duct structure 30, an amount of an airflow that flows to the corner portion 8 along the front surface 3 in the vehicle width direction can be effectively reduced, and the aerodynamic performance such as aerodynamic characteristics and steering stability of the automobile 1 can be effectively improved.

In particular, for example, since the front introduction hole 11 is formed to be vertically long along an edge in the vehicle width direction of the front bumper face member 10 in a range in which the front bumper face member 10 can be viewed from the front side, a large part of an airflow that hits the front surface 3 of the vehicle body 2 can be suctioned into the front introduction hole 11 and exhausted to the rear side through the duct structure 30.

In the present embodiment, even when an amount of air flowing in from the front introduction hole 11 is increased, a part of the air can be exhausted from the branch exhaust holes 25 and 27 formed in a portion between a connection portion with the front introduction hole 11 and a portion where the rear exhaust hole 23 is formed to overflow toward an inner side of the front bumper face member 10 that is outside of the duct structure 30. An amount of air that can flow in from the front introduction hole 11 is not limited by an amount of air that can be exhausted from the rear exhaust hole 23. Therefore, for example, even when the speed of the automobile 1 is increased, the front introduction hole 11 can suction an airflow at an amount corresponding to the speed. Even in a case where the speed of the automobile 1 is low or a case where the speed of the automobile 1 is high, the front introduction hole 11 can suction an airflow at an amount corresponding to the speed, so that the airflow can be effectively prevented from flowing to the corner portion 8 in the vehicle width direction along the front surface 3 and aerodynamic performance of the automobile 1 can be effectively improved.

In the present embodiment, the duct structure 30 is formed by the inner surface of the front bumper face member 10 and the duct member 20 that is fitted with the inner surface so as to form a duct space between the inner surface of the front bumper face member 10 and the duct member 20. As a result, different from a case where, for example, a cylindrical duct member 20 is provided inside the front bumper face member 10, a space inside the vehicle body 2 is not occupied at a large amount. Moreover, the duct member 20 overlaps with the inner surface of the front bumper face member 10, so that the rigidity of the front bumper face member 10 can be increased by the duct member 20. In particular, when the duct structure 30 is vertically long, the rigidity of the corner portion 8 of the front bumper face member 10 is increased as a whole.

In the present embodiment, the rear exhaust hole 23 for exhausting air to the wheel house 6 is formed to be vertically long along an outer edge of the wheel house 6. Accordingly, at least a part of the rear exhaust hole 23 can be positioned outside an outer surface of the wheel member 7 disposed in the wheel house 6. An airflow exhausted from the rear exhaust hole 23 to the wheel house 6 flows to the outside of the outer surface of the wheel member 7 disposed in the wheel house 6, and is less likely to hit the front surface 3 of the wheel member 7. In a case where air is exhausted to the front surface 3 of the wheel member 7, the air hits the front surface 3 of the wheel member 7, a flow velocity in the duct structure 30 may be reduced and aerodynamic performance may be lowered. Such a case can be effectively prevented in the present embodiment.

In the present embodiment, the branch duct portions 24 and 26 directed to the inner side of the front bumper face member 10 that is outside of the duct structure 30 are formed in a flow path section from the front introduction hole 11 to the rear exhaust hole 23 in the duct structure 30. In this case, the branch exhaust holes 25 and 27 are formed at tip ends of the branch duct portions 24 and 26.

Flow paths of the branch duct portions 24 and 26 are formed so as to intersect in an opposite direction with a direction of an airflow in the duct structure 30.

Accordingly, for example, in a situation in which air can be sufficiently exhausted from the rear exhaust hole 23, an airflow suctioned into the duct structure 30 from the front introduction hole 11 flows in the duct structure 30 as the airflow is, and is mainly exhausted from the rear exhaust hole 23.

On the other hand, when air cannot be sufficiently exhausted from the rear exhaust hole 23, a pressure inside the duct structure 30 increases. Due to the pressure increase, an excessive portion of the airflow suctioned into the duct structure 30 from the front introduction hole 11 flows from the branch exhaust holes 25, 27 toward the inner side of the front bumper face member 10 through the branch duct portions 24, 26. The pressure inside the duct structure 30 is prevented from increasing. Accordingly, an amount of airflow that can be suctioned into the duct structure 30 from the front introduction hole 11 is less likely to reduce. Even in a case where the speed of the automobile 1 is low and a case where the speed of the automobile 1 is high, the front introduction hole 11 can suction an airflow at an amount corresponding to the speed, so that the airflow can be effectively prevented from flowing to the corner portion 8 in the vehicle width direction along the front surface 3 and aerodynamic performance of the automobile 1 can be effectively improved.

As described above, aerodynamic performance such as aerodynamic characteristics and steering stability of the automobile 1 can be improved in the present embodiment.

The cover members 40 are provided at both end portions in the vehicle width direction of the front bumper face member 10, even when the cover members 40 are formed with recessed portions and protruding portions in an airflow direction, deterioration of steering stability due to the recessed portions and the protruding portions can be effectively prevented.

The embodiment described above is an example of a preferred embodiment of the present disclosure, the present disclosure is not limited thereto, and various modifications or changes can be made without departing from the gist of the disclosure.

What is claimed is:

1. A vehicle front structure for a vehicle, the vehicle including a front exterior member provided on a front surface of a vehicle body of the vehicle, the vehicle front structure comprising:
a front introduction hole formed in an end portion of the front exterior member in a vehicle width direction; and
a duct structure coupled to the front introduction hole inside the front exterior member, wherein the duct structure includes:
a rear exhaust hole configured to exhaust air to a wheel house located at a rear side of the front exterior member in the vehicle body; and
a branch exhaust hole formed in a flow path section provided between the front introduction hole and the rear exhaust hole,
wherein the duct structure includes a branch duct portion that directs to an inner side of a front bumper face member in the flow path section,
wherein the front bumper face member is outside of the duct structure,
wherein the branch exhaust hole is formed at a tip end of the branch duct portion, and
wherein the branch duct portion is formed so as to intersect with a direction of an airflow in the duct structure.

2. The vehicle front structure according to claim 1, wherein the front exterior member includes the front bumper face member constituting an outer surface of a front portion of the vehicle body, and wherein the duct structure is formed by an inner surface of the front bumper face member and a duct member that is fitted with the inner surface so as to form a duct space between the duct member and the inner surface.

3. The vehicle front structure according to claim 2, wherein the front introduction hole is formed to be vertically long along an edge of the front exterior member in the vehicle width direction in a range in which the front exterior member is viewed from a front side.

4. The vehicle front structure according to claim 3, wherein the rear exhaust hole is formed to be vertically long along an outer edge of the wheel house.

5. The vehicle front structure according to claim 2, wherein the rear exhaust hole is formed to be vertically long along an outer edge of the wheel house.

6. The vehicle front structure according to claim 1, wherein the front introduction hole is formed to be vertically long along an edge of the front exterior member in the vehicle width direction in a range in which the front exterior member is viewed from a front side.

7. The vehicle front structure according to claim 6, wherein the rear exhaust hole is formed to be vertically long along an outer edge of the wheel house.

8. The vehicle front structure according to claim 1, wherein the rear exhaust hole is formed to be vertically long along an outer edge of the wheel house.

9. The vehicle front structure according to claim 1, wherein the duct structure further comprises:
- a plurality of the branch exhaust holes corresponding to a plurality of the front introduction holes and a plurality the rear exhaust holes; and
- a plurality of the branch duct portions, and
- wherein the airflow flowing toward each of the plurality of the branch exhaust holes through the plurality of the branch duct portions is in a direction intersecting at an obtuse angle with the direction of the airflow flowing from each of the plurality of the front introduction holes at a left side toward the plurality of the rear exhaust holes.

10. A front exterior member to be provided on a front surface of a vehicle body of a vehicle, the front exterior member comprising:
- a front introduction hole formed in an end portion of the front exterior member in a vehicle width direction; and
- a duct structure coupled to the front introduction hole inside the front exterior member,
- wherein the duct structure includes:
  - a rear exhaust hole configured to exhaust air to a wheel house located at a rear side of the front exterior member in the vehicle body; and
  - a branch exhaust hole formed in a flow path section provided between the front introduction hole and the rear exhaust hole,
- wherein the duct structure includes a branch duct portion that directs to an inner side of a front bumper face member in the flow path section,
- wherein the front bumper face member is outside of the duct structure,
- wherein the branch exhaust hole is formed at a tip end of the branch duct portion, and
- wherein the branch duct portion is formed so as to intersect with a direction of an airflow in the duct structure.

11. The front exterior member according to claim 10, wherein the duct structure further comprises:
- a plurality of the branch exhaust holes corresponding to a plurality of the front introduction holes and a plurality the rear exhaust holes; and
- a plurality of the branch duct portions, and
- wherein the airflow flowing toward each of the plurality of the branch exhaust holes through the plurality of the branch duct portions is in a direction intersecting at an obtuse angle with the direction of the airflow flowing from each of the plurality of the front introduction holes at a left side toward the plurality of the rear exhaust holes.

* * * * *

UNITED STATES PATENT AND TRADEMARK OFFICE
CERTIFICATE OF CORRECTION

PATENT NO. : 11,760,428 B2
APPLICATION NO. : 17/526602
DATED : September 19, 2023
INVENTOR(S) : Hiroki Aoyanagi, Hideki Hata and Koushi Yamada Page 1 of 1

It is certified that error appears in the above-identified patent and that said Letters Patent is hereby corrected as shown below:

On the Title Page

(73) Assignee should read: SUBARU CORPORATION, Tokyo (JP); TOYOTA JIDOSHA KABUSHIKI KAISHA, Toyota-shi (JP).

Signed and Sealed this
Twelfth Day of November, 2024

Katherine Kelly Vidal
*Director of the United States Patent and Trademark Office*